US006978378B1

(12) United States Patent
Koretz

(10) Patent No.: US 6,978,378 B1

(45) Date of Patent: Dec. 20, 2005

(54) SECURE FILE TRANSFER SYSTEM

(75) Inventor: David A. Koretz, Rochester, NY (US)

(73) Assignee: BlueTie, Inc., Rochester, NY (US)

( * ) Notice: Subject to any disclaimer, the term of this patent is extended or adjusted under 35 U.S.C. 154(b) by 702 days.

(21) Appl. No.: 09/853,538

(22) Filed: May 11, 2001

Related U.S. Application Data

(60) Provisional application No. 60/203,746, filed on May 12, 2000.

(51) Int. Cl.[7] .................................................. G06F 1/24

(52) U.S. Cl. ....................... 713/193; 713/200; 713/201

(58) Field of Search ................................ 713/193, 200, 713/201

(56) References Cited

U.S. PATENT DOCUMENTS

| | | | |
|---|---|---|---|
| 5,442,707 A | 8/1995 | Miyaji et al. | 380/30 |
| 5,509,074 A | 4/1996 | Choudhury et al. | 380/23 |
| 5,615,268 A | 3/1997 | Bisbee et al. | 380/25 |
| 5,727,057 A | 3/1998 | Emery et al. | |
| 5,737,424 A | 4/1998 | Elteto et al. | 380/28 |
| 5,790,790 A | 8/1998 | Smith et al. | 395/200.36 |
| 5,802,518 A | 9/1998 | Karaev et al. | 707/9 |
| 5,848,131 A | 12/1998 | Moore et al. | |
| 5,848,161 A | 12/1998 | Luneau et al. | 380/49 |
| 5,870,470 A | 2/1999 | Johnson et al. | 380/6 |
| 5,870,544 A | 2/1999 | Curtis | 395/187.01 |
| 5,875,296 A | 2/1999 | Shi et al. | 395/188.01 |
| 5,893,118 A | 4/1999 | Sonderegger | 707/203 |
| 5,974,441 A | 10/1999 | Rogers et al. | 709/200 |
| 6,006,332 A | 12/1999 | Rabne et al. | 713/201 |
| 6,065,046 A * | 5/2000 | Feinberg et al. | 709/216 |
| 6,219,669 B1 * | 4/2001 | Haff et al. | 707/10 |

FOREIGN PATENT DOCUMENTS

WO WO00/23862 A3 4/2000

* cited by examiner

*Primary Examiner*—Thomas R. Peeso

(74) *Attorney, Agent, or Firm*—Nixon Peabody LLP

(57) ABSTRACT

A secure file transfer system which, in its preferred embodiments, uses a Java applet sent to a client computer from a server computer to double encrypt files sent from the client computer to the server computer. Once a file is sent to the server, the system notifies a recipient that a secure document awaits pickup. The system preferably uses a public shared key agreement scheme for one method of encryption and an elliptical encryption scheme for the other. The applet comes to the client computer with a shared secret key for the public key scheme and all parameters required for the elliptical encryption scheme. Upon receiving a request for secure transfer, the server sends the applet with the encryption parameters to the client machine, which must be running a client-side application or a Java-enabled browser. The applet prompts the user for the file to be transferred and encrypts the file with the elliptical encryption method. The applet then sends the encrypted file to the server in blocks, encrypting each block with the public key scheme as it is sent. The system decrypts the blocks and reassembles them into the encrypted file and then notifies the recipient of the file's presence.

44 Claims, 14 Drawing Sheets

Sending a file block

Receiving a file block

Mendez-Qu-Vanstone Key Agreement – version with cofactor multiplication (MQVC)
(According to IEEE P1363 draft February 8, 1999)

SECURE FILE TRANSFER SYSTEM

This application claims the benefit of U.S. Provisional Application No. 60/203,746, filed 12 May 2000, which provisional application is incorporated by reference herein.

TECHNICAL FIELD

The invention relates to secure file transfers over computer networks, especially secure file transfers involving encryption of the file.

BACKGROUND OF THE INVENTION

There are many encryption schemes available to computer users for secure file transfer, but most require that the user download a software application for encryption of the file before sending the file. Tumbleweed, in U.S. Pat. No. 5,790,790 to Smith et al., developed a less burdensome document delivery system that is used by many delivery companies to facilitate delivery of "e-packages," but the scheme suffers from drawbacks. One of the most significant drawbacks is the system's use of relatively weak encryption based on the Secure Sockets Layer, which cannot be changed without a fundamental alteration of the transfer scheme.

SUMMARY OF THE INVENTION

The instant invention overcomes the drawbacks of the prior art by providing strong encryption in a relatively client-independent format using a client-side application, such as a Java applet run on the client side to encrypt the file, preferably using elliptical encryption. Further, the preferred embodiment uses a second encryption method to encrypt each block of the encrypted file as it is sent to the server by the client-side application, such as the applet previously mentioned, the server storing the blocks as they arrive and reassembling the encrypted file. The system notifies the recipient of the presence of the file, preferably in an e-mail message or the like including a hypertext link; and the process is reversed when the recipient accesses the file.

DESCRIPTION OF THE INVENTION

Figure 1:
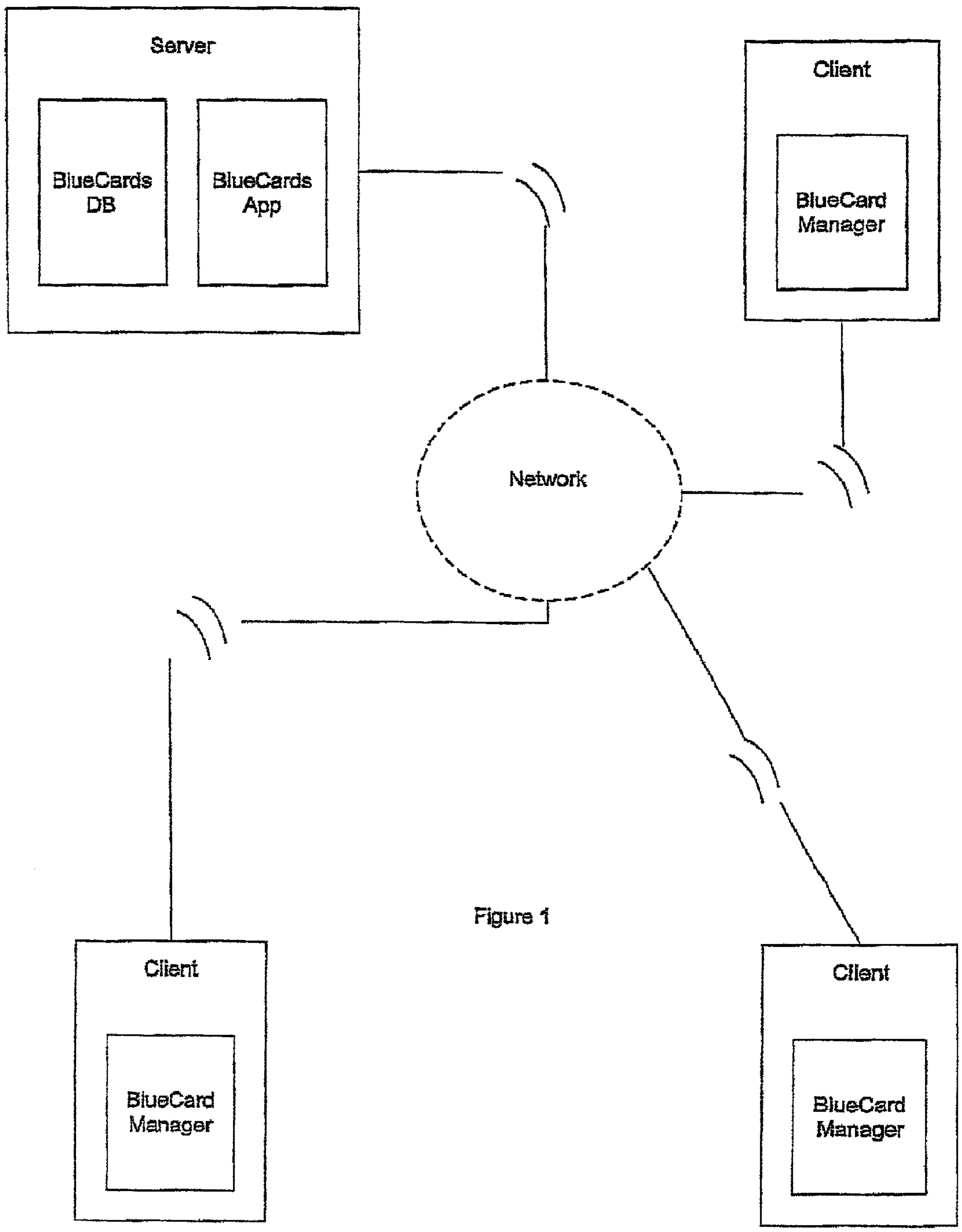
FIG. 1 is a schematic representation of the server, network, and clients used in the instant invention.
Figure 2:
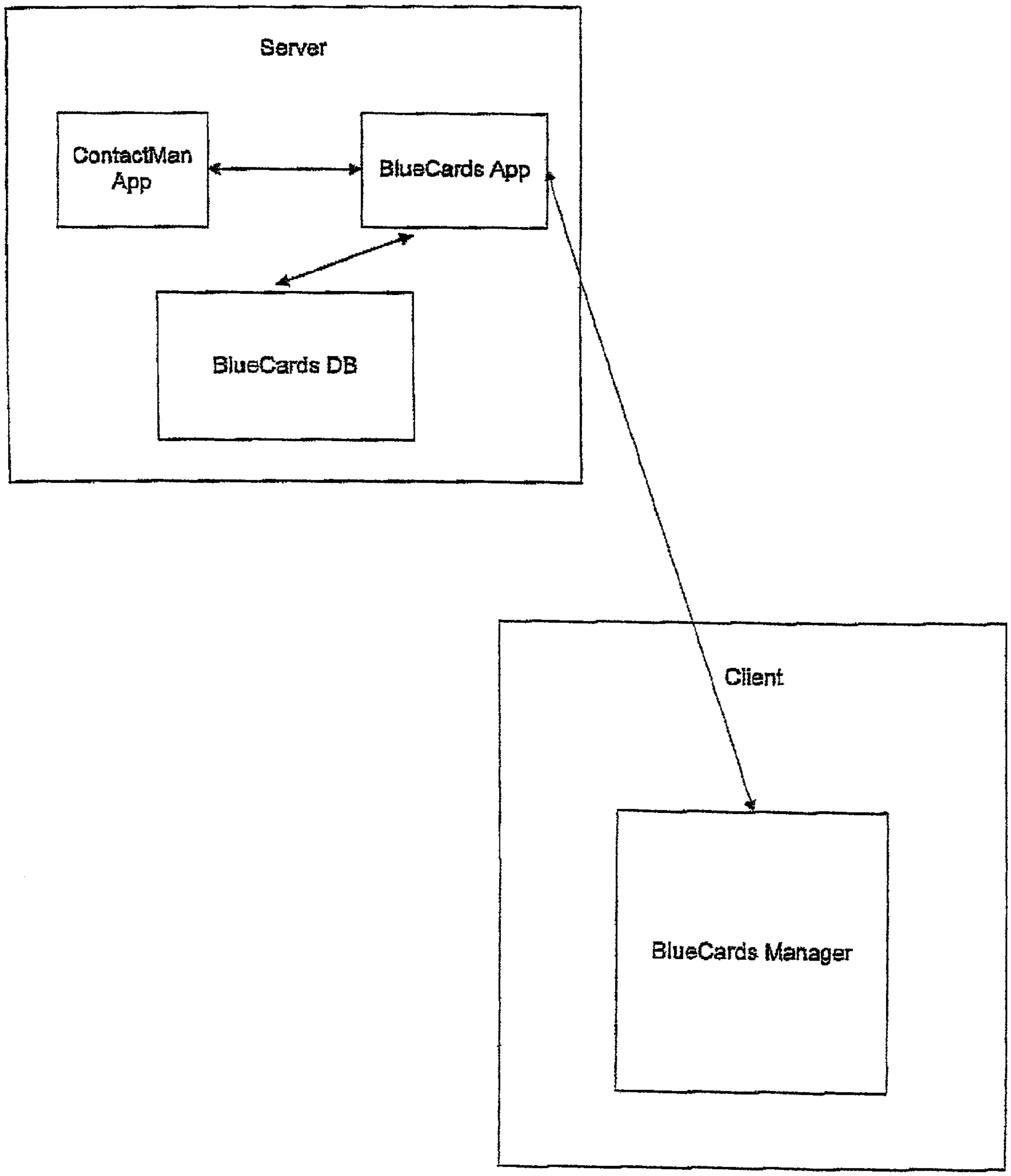
FIG. 2 is a schematic representation of the invention deployed in a server.
Figure 3:
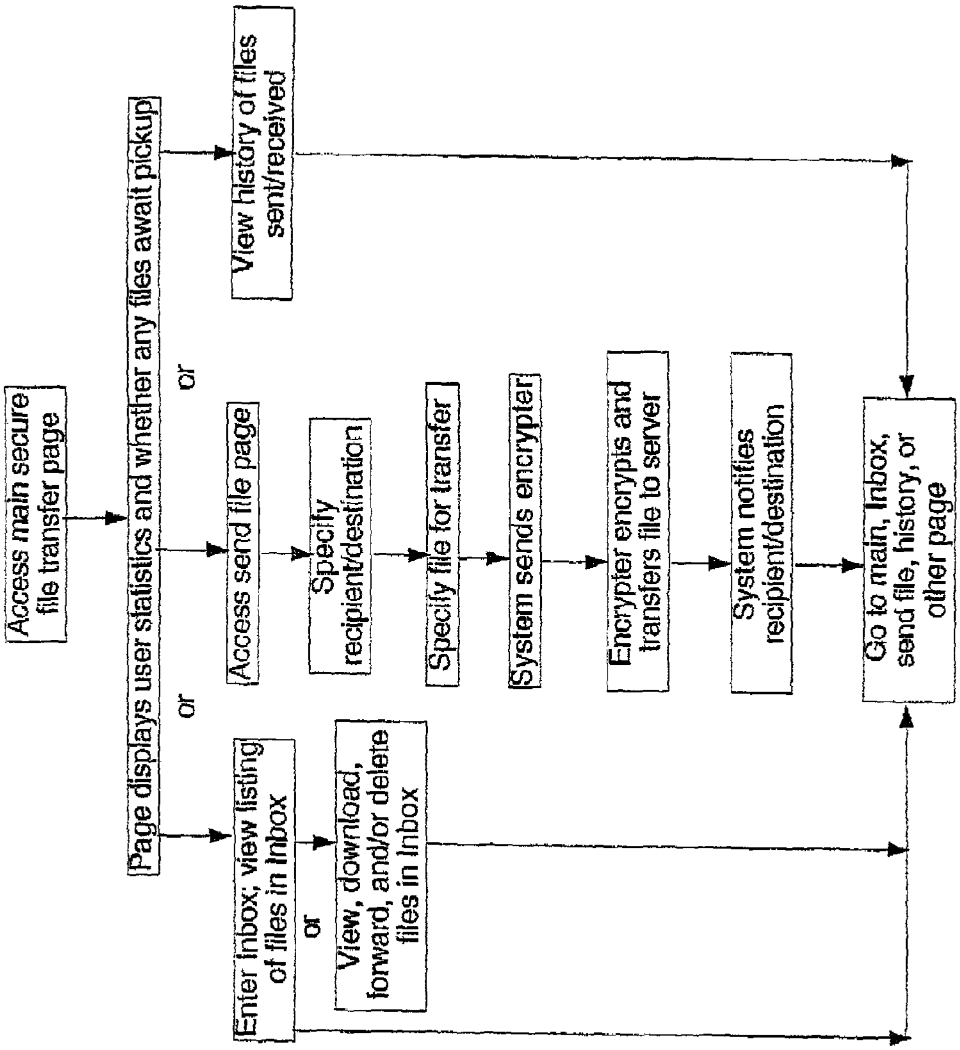
FIG. 3 is a schematic flow diagram of paths users can follow within the preferred embodiment of the invention as well as some actions taken by the system in response thereto.
Figure 4:
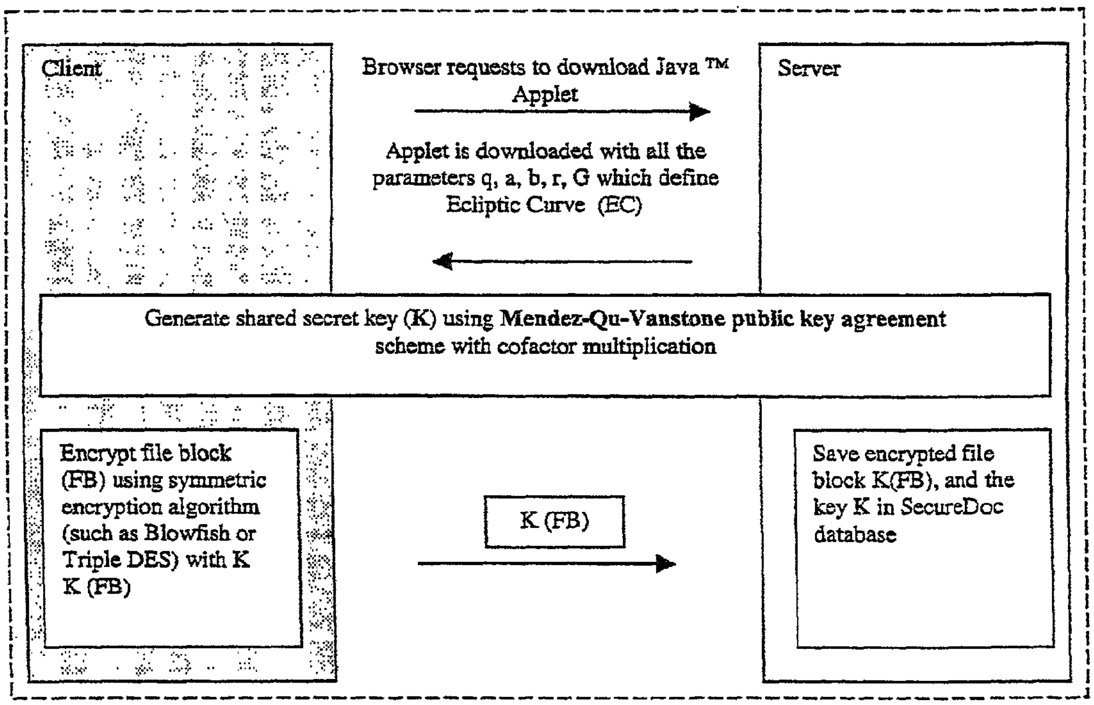
FIG. 4 is a schematic flow diagram of a preferred implementation of the encryption features of the invention.
Figure 4:
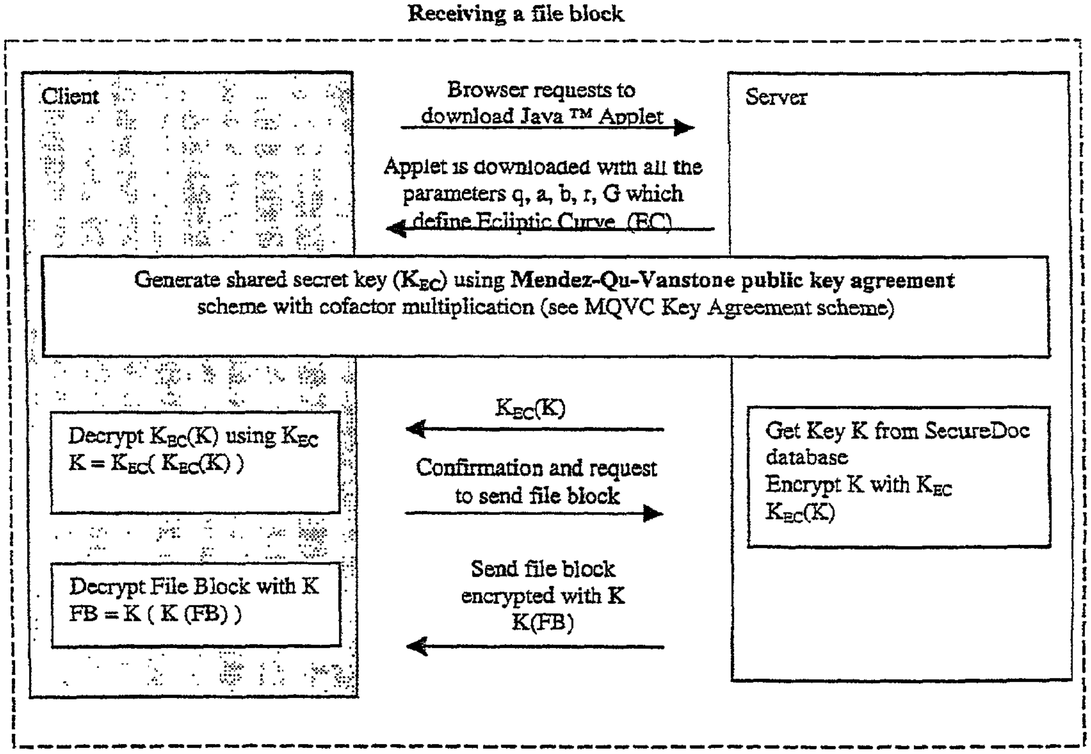
Figure 5:
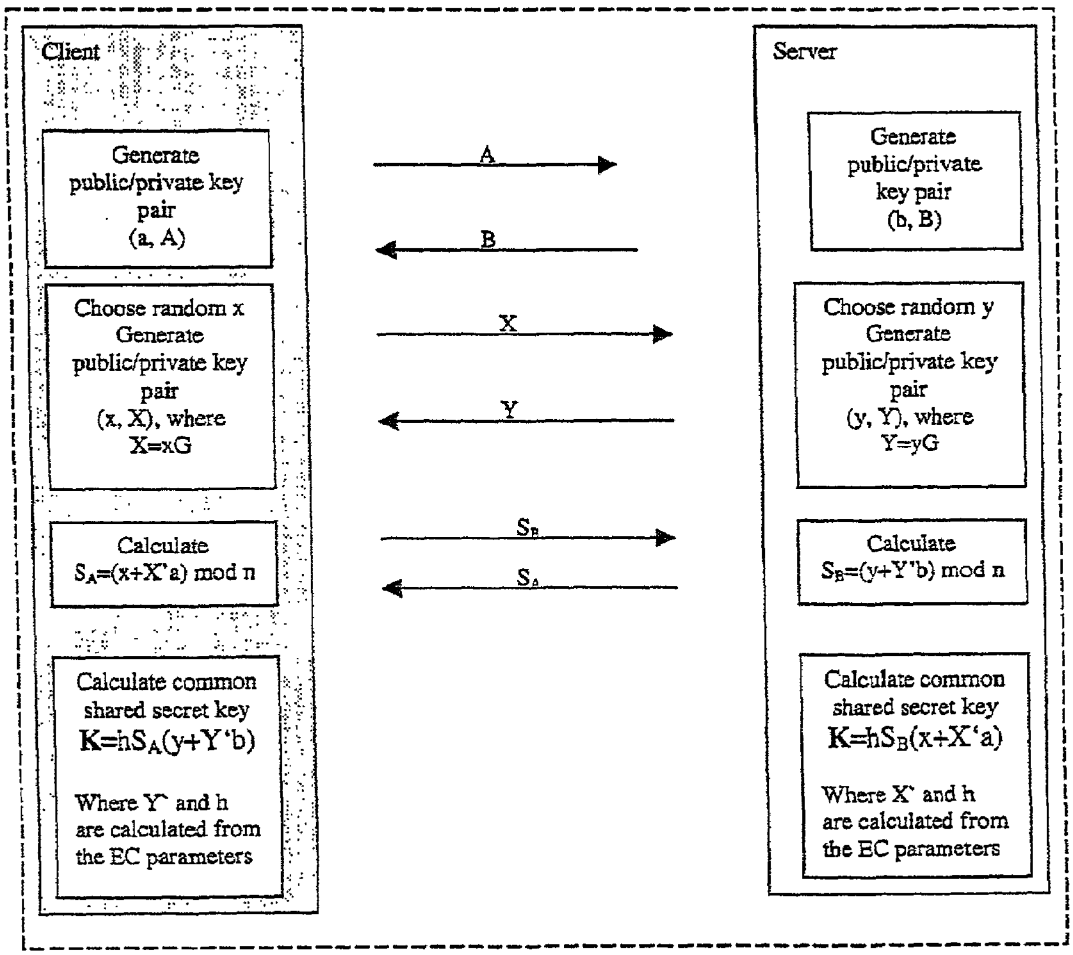
FIG. 5 is a schematic flow diagram of a key pair encryption scheme usable in the invention.
Figure 6:
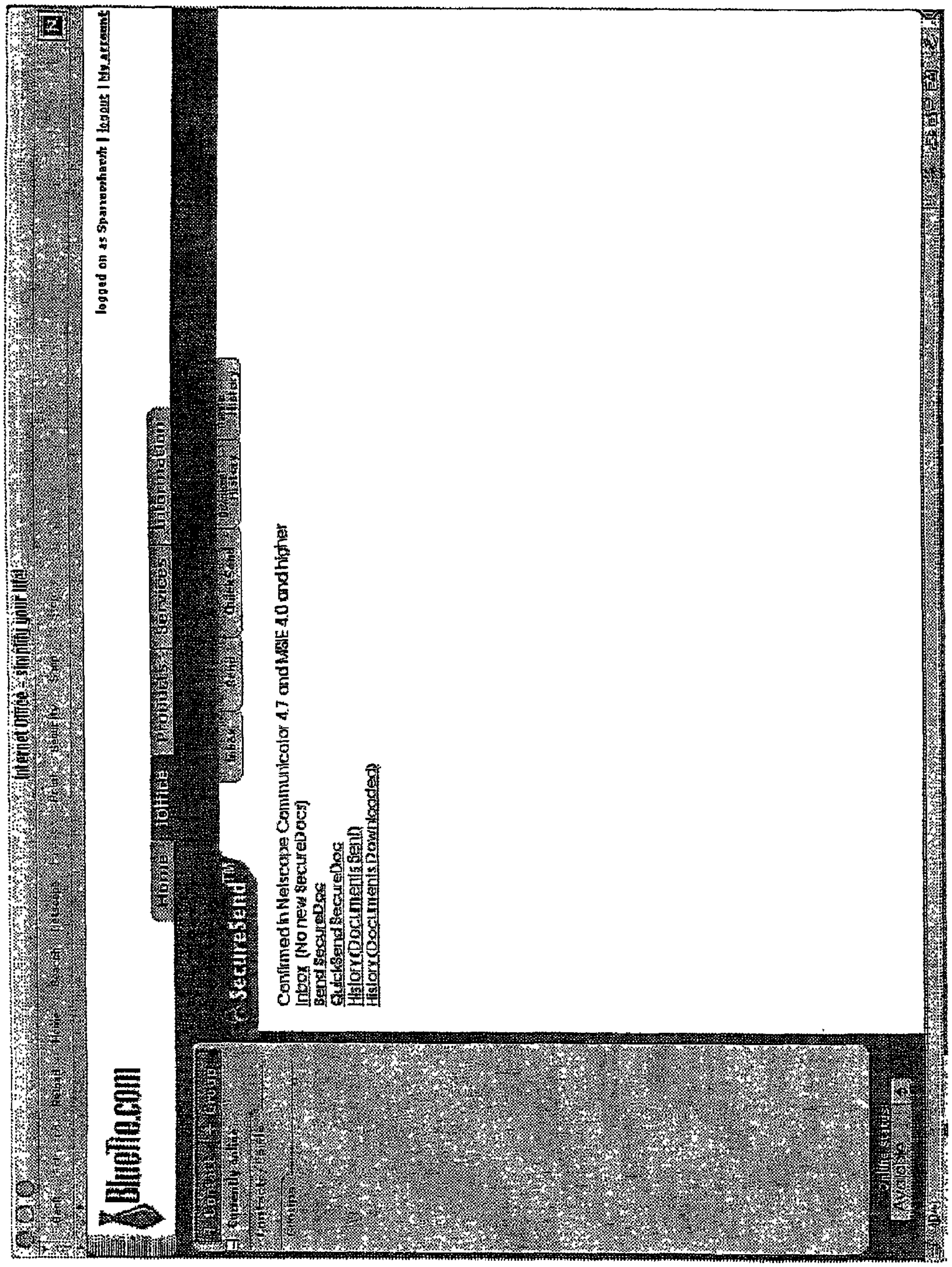
FIG. 6 is a schematic screenshot of a main secure file transfer page of a preferred implementation of the invention.
Figure 7:
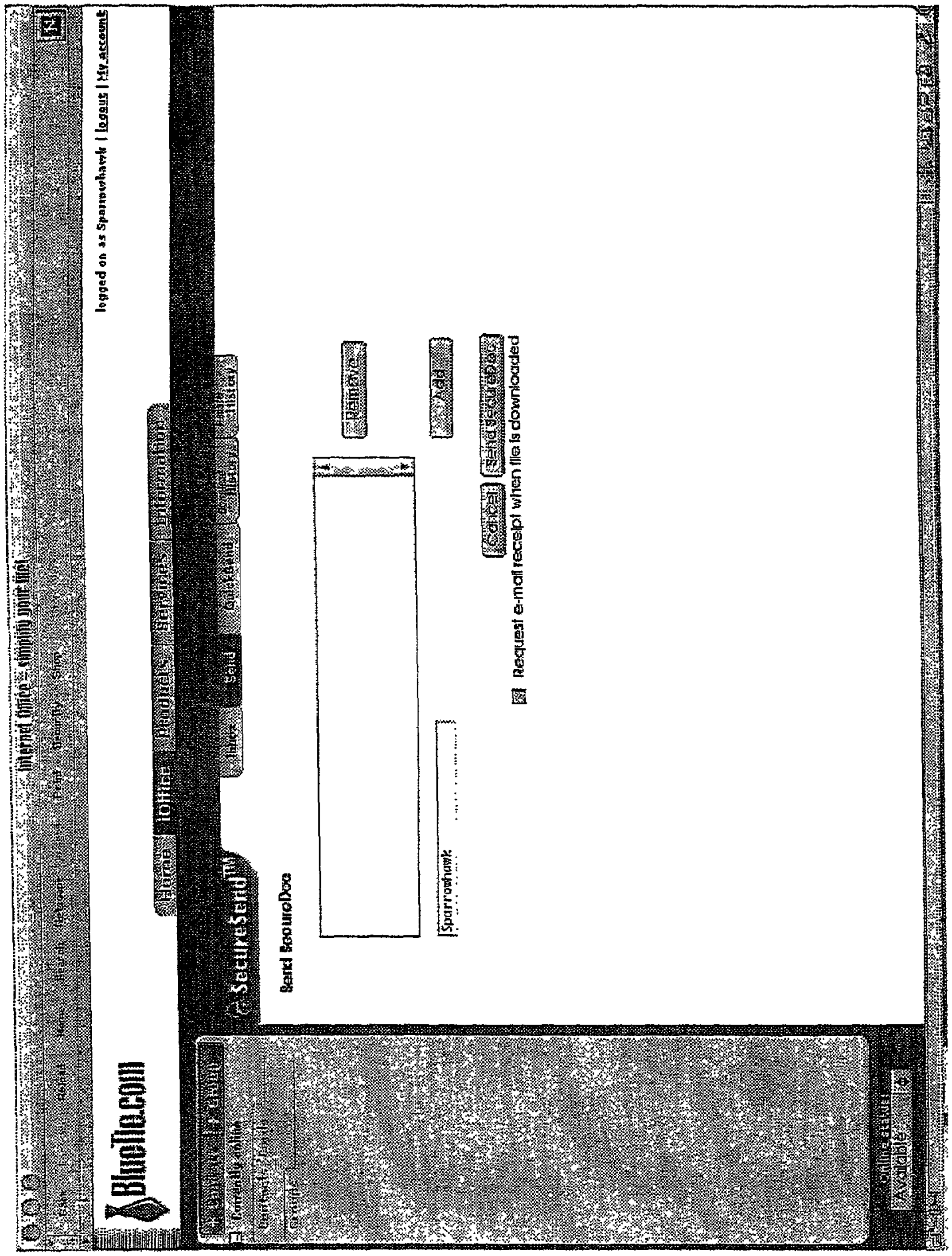
FIG. 7 is a schematic screenshot of a destination entry page of a preferred implementation of the invention with an addressee entered into the destination entry field.
Figure 8:
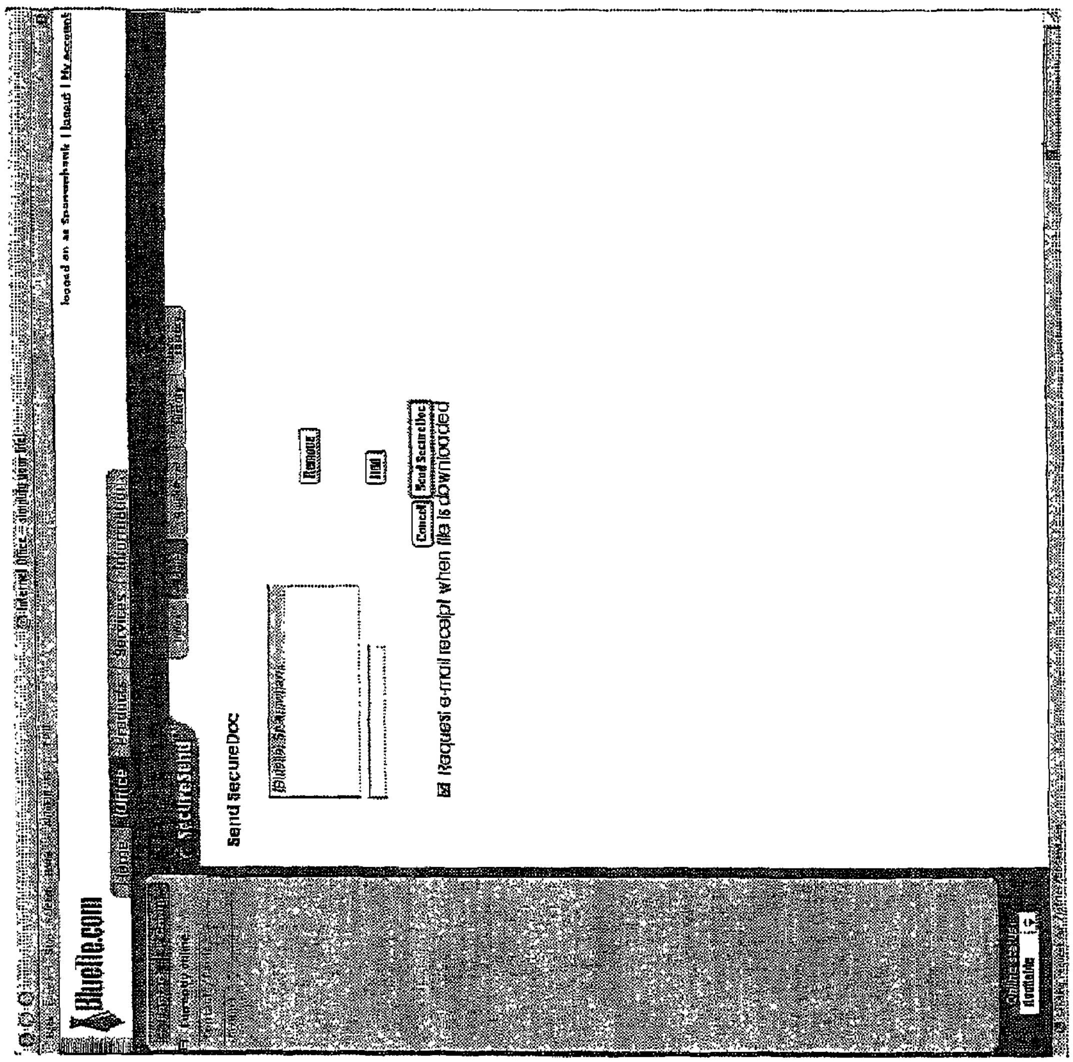
FIG. 8 is a schematic screenshot of the destination entry page of a preferred implementation of the invention as shown in FIG. 7 with a user-addressee listed in the destination list after pressing the "Add" button in FIG. 7.
Figure 9:
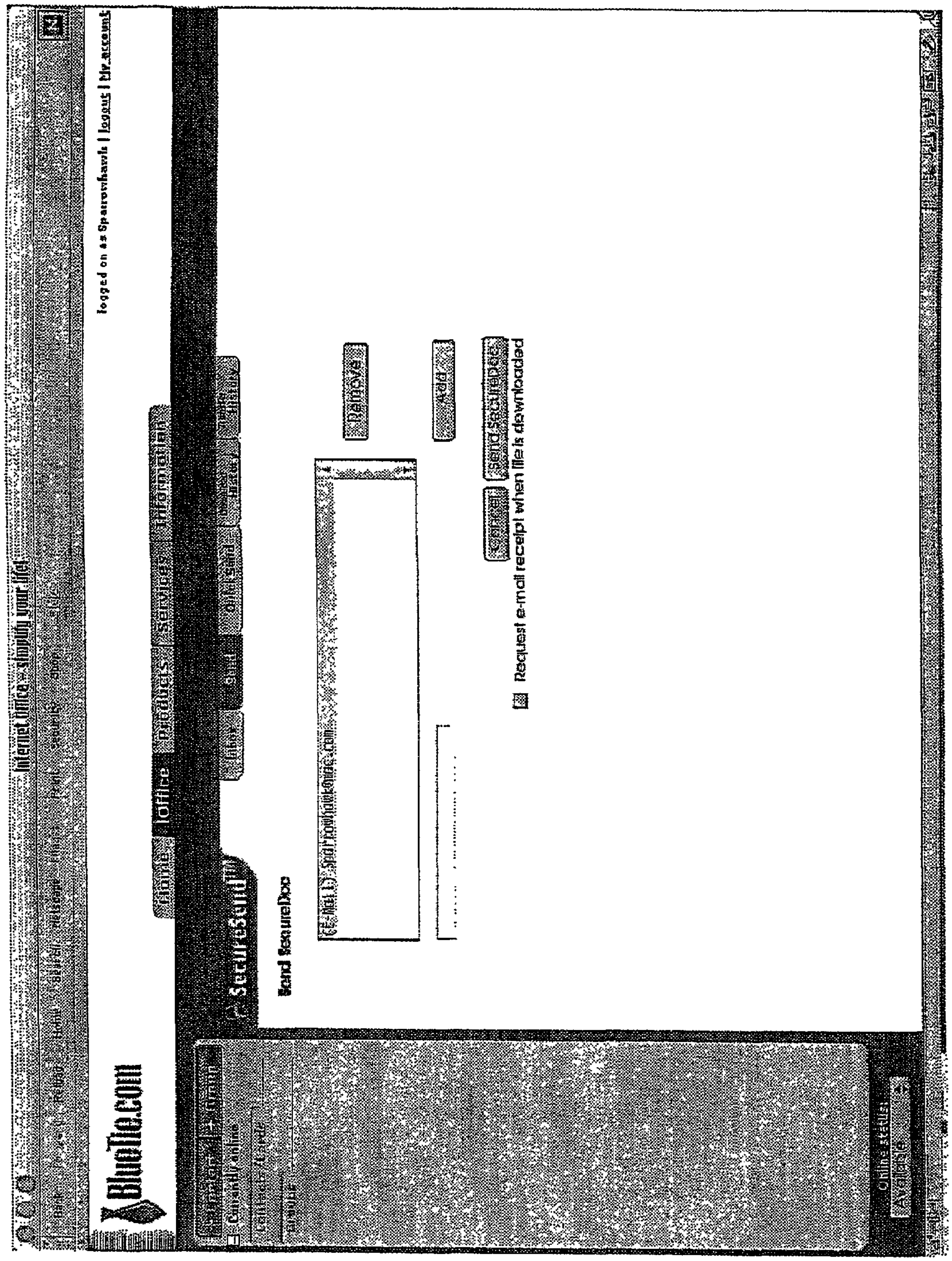
FIG. 9 is a schematic screenshot of the destination entry page of a preferred implementation of the invention as shown in FIG. 7 with an e-mail-addressee listed in the destination list after pressing the "Add" button in FIG. 7.
Figure 10:
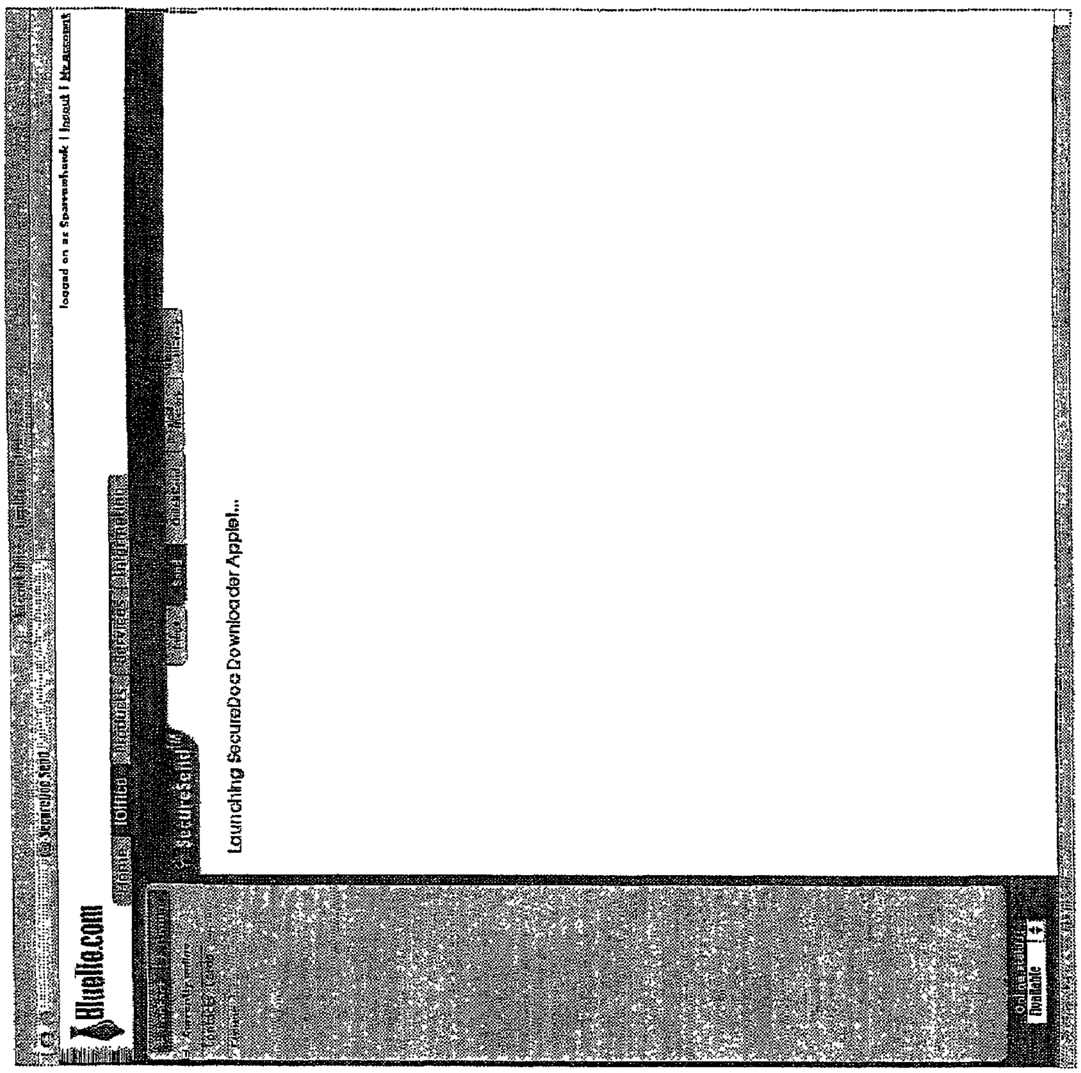
FIG. 10 is a schematic screenshot of a preferred implementation of the invention as the client machine receives the encrypter from the server.
Figure 11:
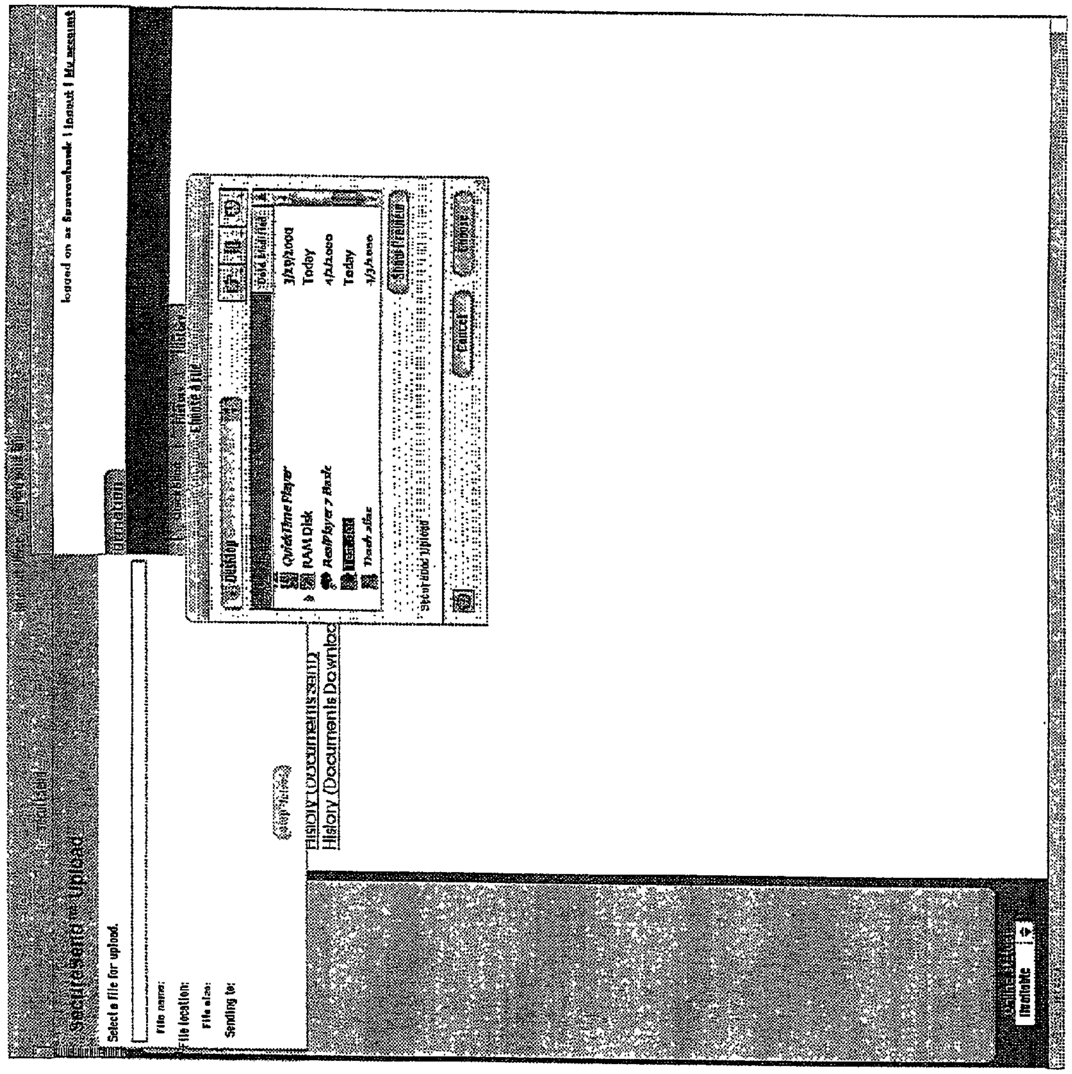
FIG. 11 is a schematic screenshot of the encrypter of a preferred implementation of the invention prompting the user to identify a file for transfer on a volume to which the client machine has access.
Figure 12:
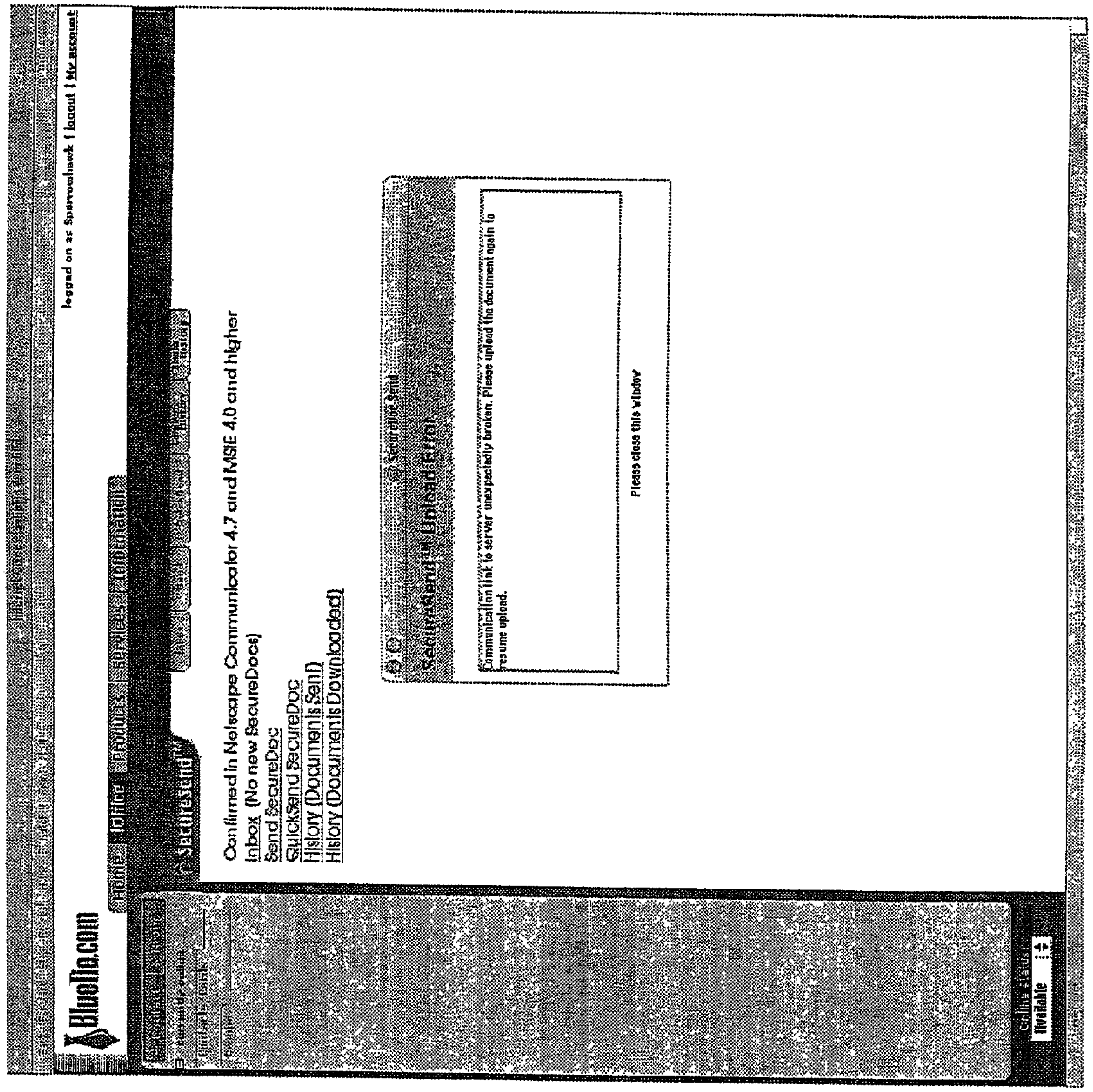
FIG. 12 is a schematic screenshot of the encrypter of a preferred implementation of the invention notifying the user of an interrupted transfer.
Figure 13:
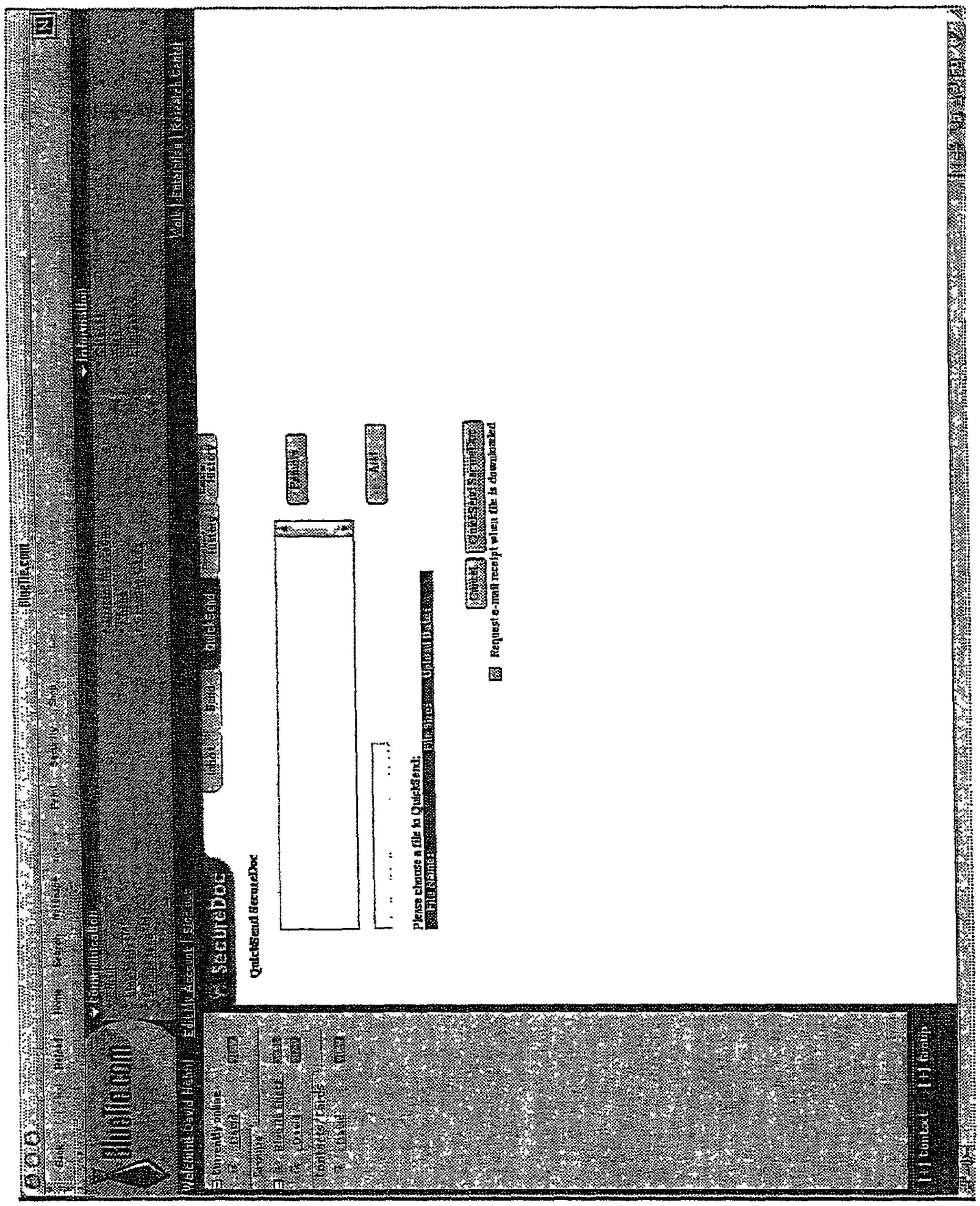
FIG. 13 is a schematic screenshot of a page allowing designation of addressees and files for sending from a server-controlled storage medium under a preferred implementation of the invention.
Figure 14:
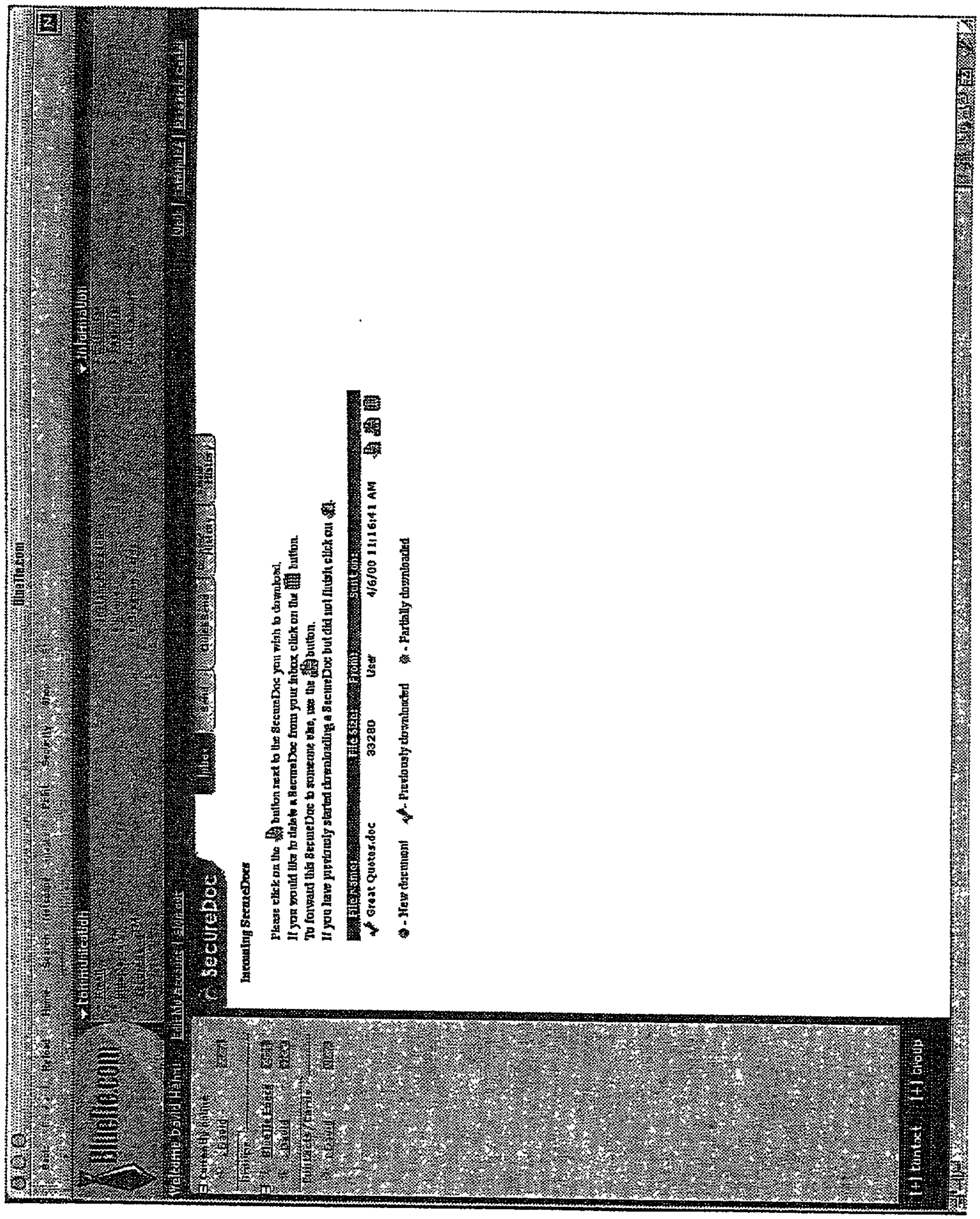
FIG. 14 is a schematic screenshot of an inbox of the invention.

The instant system provides subscriber users with the ability to transfer strongly encrypted documents to other subscribers and to non-subscribers. The system tolerates transfer interruptions and, since it is based on Java technology, requires no software other than a conventional Java enabled Web browser. The steps the system undergoes can be broken down into a few well-defined actions. The system applies strong encryption to all files to provide the highest level of security for users, and the system maintains a history of all transfers to assist users in tracking senders and recipients.

The system can use the recipient information from the Information Distribution System of U.S. patent application Ser. No. 09/853,537 filed concurrently herewith and can be used with the Information Autocompletion System of U.S. patent application Ser. No. 09/853,539 filed concurrently herewith. The disclosures of the above-mentioned two application Ser. Nos. 09/853,537 and 09/853,539) are hereby incorporated by reference.

Sending a Document

To send a document, a user visits the request page and provides a destination in the form of a subscriber username or non-subscriber e-mail address. The system allows the user to designate a path to the file the user wishes to transfer or to use conventional GUI dialog box technology to browse accessible storage media to locate and select the file to be sent. The system preferably includes a status display, initially set to "Ready" by default, so the user can easily tell how the transfer proceeds. When the user has provided the destination and file to be transferred, the user initiates transfer by, for example, clicking a "Send" button on the request page. I prefer to also provide an additional "Quick Send" option at this point. Once the user initiates transfer, the system begins breaking up and encrypting the file; and the system preferably provides a "Stop" button or the like to allow cancellation of the transfer.

The request page preferably displays a number of statistics for the user. For example, if users are given a limit on the number of free transfers they can make, the system can display how many transfers are left; if the system imposes a file size limit on the user, the system can display this as well. The system can also display user messages, such as how long the file will be stored on the system before deletion.

As the system uploads the file, an application on the client-side, such as a Java applet, breaks the file into blocks of a predetermined size. I prefer to use a fixed block size (10

KB, for example), but the block size can also be based on the size of the original file. The system then generates a request, which the system sends to the client-side application from the server-side application hosting the main portion of the system. The server-side application sends all parameters required for the encryption portion of the transfer; where the system uses elliptical encryption, the parameters will include all parameters (q, a, b, r, G) that define an elliptical curve (EC). The client-side application generates a shared, secret key (K) using, for example, the Mendez-Qu-Vanstone public key agreement scheme with cofactor multiplication according to IEEE P1363 draft Feb. 8, 1999, the disclosure of which is hereby incorporated by reference. The client-side application then encrypts the encrypted file block (FB) using a symmetric encryption algorithm with K, K(FB). The encrypted block, along with the key, is sent to the server and stored in the system database. The file can be "unsent" up to the time the recipient downloads the file.

At the receiving end, the recipient can download the file via a simple and intuitive process. The user simply opens a client-side application, such as a Java applet, that presents the user with a form including a download progress indicator, a destination field, an initiation object, and an abort object. The download progress indicator allows the user to easily monitor the status of the download at any particular time; as with the upload, the initial display is something along the lines of "Ready" by default. The destination field can be completed manually (typing in a destination path for the file) or by invoking a conventional GUI dialog box to browse accessible storage media to locate and select the destination. The system then sends the encrypted file in blocks of varying size, each block including its own key that accompanies the document. If a transfer error occurs, this method of transfer allows the user to resume download from the point of the error instead of starting over from the beginning of the document.

The preferred encryption algorithm for the encryption key of the instant invention is elliptical curve (EC) encryption. The client-side application, such as a Java applet, the user downloads from the server preferably includes all parameters required to define the elliptic curve used in the encryption; and the applet preferably generates a shared, secret key using the Mendez-Qu-Vanstone public key agreement scheme with cofactor multiplication. The key K is sent from the system database on a server; K is preferably encrypted with the elliptical curve, and the applet decrypts the encrypted key KEC(K) using KECK=KEC(KEC(K)). Once the applet decrypts the key K, the applet sends a confirmation to the server and requests a file block. The applet decrypts the file block, and all subsequent file blocks, with KFB=K(K(FB)) until the applet receives and decrypts all blocks of the file.

The user can forward documents using a forward document form on the system. The form includes a text field in which the user provides information about the file being forwarded, a recipient field (one-click enabled) that can accept multiple subscriber usernames or non-subscriber e-mail addresses, a forward initiation object (such as a button), and an abort object (such as a cancel button).

The system allows users to view a history of documents they have manipulated with the system. The information the system provides preferably includes document name, date of transfer, document size, type of operation, sender name, and recipient name. Viewing the history allows users to detect unauthorized transfers if someone has hijacked their accounts and to keep track of the number of transfers made as compared to the users' limits. Users preferably can neither delete any records from the history nor delete the history itself.

The system notifies a recipient of an incoming secure document by system notification and universal inbox. Non-subscribers preferably receive an e-mail message with a hot link to a particular web page including entrance to the system.

Optionally, the system can notify the sender when a recipient opens a sent file or document. The sender preferably receives an e-mail message stating that the recipient opened the file and is given the option to prevent notification of such occurrences in the future. Once the file has been opened, the sender cannot "unsend" it.

I prefer to provide only a paid access level at which a user is allowed unlimited file transfers. However, other access schemes could be used, such as a scheme including two levels of user privilege: Free and Subscribed. Free users would be allowed particular secure downloads per month, after which additional downloads would count as document transfers. Free users would also have access to a given file for a particular number of days, after which time the system deletes the file. Further, Free users could download up to a particular size limit per download and up to a particular number of transfers per month. Subscribers would receive more downloads per month, could have access to documents for a longer period, could have a higher size per transfer limit, and could have an unlimited number of transfers per month. In any case, the system deletes documents to which no users have access, which deletion (or "Cleanup") is performed on a monthly basis, checking documents for time restrictions and counters for downloads/transfers, all of which are reset.

My invention can be varied in many ways without exceeding the scope of the inventive concept. For example, ECC can be used to generate the session key and Triple DES can be used to encrypt and decrypt the file. We could also use a variety of symmetrical encryption algorithms for encryption, including Rijndael, Blowfish, and future algorithms developed for the Advanced Encryption Standard.

I claim:

1. A secure file transfer system hosted on a server computer connected to a computer network and accessible by users via client computers connected to the computer network and running a hypertext viewer, the system comprising:

a request page including a request submission object operable by a user at one of the client computers visiting the request page;

a destination specification page including a destination specification tool with which the user at the one of the client computers specifies a destination to another one of the client computers of the secure file transfer, the destination specification page further including a transfer initiation object operable by the user at the one of the client computers to initiate transmission of the document;

a client side application sent to the one of the client computers from the server computer upon operation by the user at the one of the client computers of the transfer initiation object, the client side application comprising:

a file picker prompting the user at the one of the client computers to select a file for transfer to the destination at the another one of the client computers, and then breaking the selected file into one or more blocks;

a key generator that generates a shared secret key and shares the key with the system on the server computer; and an encrypter that individually encrypts each of the one or more blocks and then individually sends each of the one or more blocks to the server computer; and a notifier at the server computer that notifies a recipient user at the destination at the another one of the client computers that the file awaits pickup on the server computer.

2. The system of claim 1 wherein the hypertext viewer is a web browser.

3. The system of claim 2 wherein the parameters for the elliptical encryption method include q, a, b, r, and G.

4. The system of claim 1 wherein the client-side application is a java applet.

5. The system of claim 1 wherein the first encryption method is an elliptical encryption method.

6. The system of claim 5 wherein the second encryption method is the Mendez-Qu-Vanstone public key agreement scheme with cofactor multiplication.

7. The system of claim 1 wherein the second encryption method is a public key agreement scheme.

8. The system of claim 7 wherein the manager displays a list of secure documents awaiting pickup.

9. The system of claim 1 further including a secure document manager that displays statistics relating to a user's usage of the system.

10. The system of claim 9 wherein the e-mail message includes a hypertext link to the secure document awaiting pickup.

11. The system of claim 1 wherein the notifier sends an e-mail message to the recipient.

12. The system as set forth in claim 1 wherein the client side application at the one of the client computers breaks the selected file into two or more blocks before the encryption and transmission of each of the blocks.

13. A secure file transfer system hosted on a server computer connected to a computer network and accessible by users via client computers connected to the computer network and running a desktop software application, the system comprising:

a request page including a request submission object operable by a user at one of the client computers visiting the request page;

a destination specification page including a destination specification tool with which the user at the one of the client computers specifies a destination to another one of the client computers of the secure file transfer, the destination specification page further including a transfer initiation object operable by the user at the one of the client computers to initiate transmission of the document;

a desktop software application sent to the one of client computers upon operation by the user at the one of the client computers of the transfer initiation object, the desktop software application comprising:

a file picker prompting the user at the one of the client computers to select a file for transfer to the destination at the another one of the client computers, and then breaking the selected file into one or more blocks a key generator that generates a shared secret key and shares the key with the system on the server computer; and an encrypter that individually encrypts each of the one or more blocks and individually then sends each of the one or more blocks to the server computer; and a notifier that notifies a recipient user at the destination at the another one of the client computers that the file awaits pickup on the server computer.

14. The system of claim 13 wherein the desktop software application is a Windows based software application.

15. The system of claim 13 wherein the first encryption method is an elliptical encryption method.

16. The system of claim 15 wherein the parameters for the elliptical encryption method include q, a, b, r, and G.

17. The system of claim 13 wherein the second encryption method is a public key agreement scheme.

18. The system of claim 17 wherein the second encryption method is the Mendez-Qu-Vanstone public key agreement scheme with cofactor multiplication.

19. The system of claim 13 further including a secure document manager that displays statistics relating to a user's usage of the system.

20. The system of claim 19 wherein the manager displays a list of secure documents awaiting pickup.

21. The system of claim 13 wherein the notifier sends an e-mail message to the recipient.

22. The system of claim 21 wherein the e-mail message includes a hypertext link to the secure document awaiting pickup.

23. The system as set forth in claim 13 wherein the desktop software application at the one of the client computers breaks the selected file into two or more blocks before the encryption and transmission of each of the blocks.

24. A secure file transfer method executed as a software application on a server computer connected to a computer network and accessible by users via client computers connected to the computer network and running a web browser, the method including the steps of:

receiving a request from a user for secure file transfer;

sending an Java applet to the client computer with parameters for first and second methods of encryption, the first method of encryption not requiring additional information from either side of the transfer and a shared secret key for the second method of encryption being sent in encrypted form;

receiving and decrypting with the Java applet the shared secret key for the second of encryption;

encrypting a file to be transferred with the Java applet by applying the first method of encryption;

breaking the file into blocks with the Java applet;

encrypting each block with the Java applet by applying the second method of encryption and sending the block to the server with the Java applet;

decrypting the encrypted file blocks and assembling into a decrypted file with the shared secret key as they arrive at a recipient computer;

storing the encrypted file on a mass storage device; and notifying a recipient at a destination of the file that the file 30 awaits pickup on the server computer.

25. The method of claim 24 wherein the step of applying the first method of encryption includes the substep of applying an elliptical encryption method.

26. The method of claim 24 wherein the step of applying the second method of encryption includes applying the Mendez-Qu-Vanstone public key agreement scheme with cofactor multiplication.

27. The method of claim 24 wherein the step of notifying includes sending an e-mail message to the recipient.

28. The method of claim 27 wherein the e-mail message includes a hypertext link to the file.

29. The method of claim 24 further including the step of displaying user usage statistics.

30. The method of claim 24 further including the step of providing a transfer request page from which the user requests the file transfer.

31. The method of claim 30 wherein the step of providing a transfer request page includes providing a document forwarding request.

32. A secure file transfer system hosted on a main server computer connected to a computer network and accessible by users via client computers connected to the computer network, the system comprising:

a file picker with which a sending user at one of the client computers specifies a file to be transferred to a recipient;

a file encrypter in communication with the file picker that encrypts the specified file at one of the client computers to produce an encrypted file;

a file sender that transfers the encrypted file to an encrypted file storage location at the server computer with a selected destination for the encrypted file to another one of the client computers which was selected by the sending user at the one of the client computers; and a notifier that alerts a recipient of the file at the another one of the client computers that the encrypted file awaits pickup.

33. The system of claim 32 wherein the file resides on a mass storage device on a storage server computer connected to the computer network.

34. The system of claim 33 wherein the storage server is closely associated with the main server and provides online remote storage for the sending user.

35. The system of claim 33 wherein the file picker presents the sending user with a list of files present on the storage server and accessible to the sending user.

36. The system of claim 32 wherein the storage server is closely associated with the sending user's computer and the file picker is part of a Java applet sent to the sending user's computer by the system, the file picker including a user interface tying into the sending user computer's operating system so that the user can browse storage devices closely associated with the sending user's computer.

37. The system of claim 36 wherein the storage server is a storage device that is physically part of the sending user's computer.

38. The system of claim 36 wherein the storage server is a volume directly accessible by the sending user's computer but inaccessible to the main server without the sending user's use of the file picker.

39. The system of claim 32 wherein the encrypter is a client-side routine that is part of a Java applet sent to the sending user's computer by the system, the encrypter including essential parameters for encryption.

40. The system of claim 39 wherein the encrypter uses elliptical encryption.

41. The system of claim 32 wherein the file sender breaks the file into blocks before the encryption and sends the encrypted blocks to the storage location.

42. The system of claim 41 wherein the file sender interacts with the file encrypter so that the file encrypter encrypts each block of the encrypted file as the file sender sends the block to the storage location.

43. The system of claim 41 further including a block decrypter between the file sender and the storage location that decrypts each block of the encrypted file as it receives the blocks from file sender.

44. The system of claim 41 further including an assembler between the file sender and the storage location that reassembles the blocks into the encrypted file.

* * * * *